US010808422B2

(12) United States Patent
Hernandez

(10) Patent No.: US 10,808,422 B2
(45) Date of Patent: Oct. 20, 2020

(54) SENSOR PIN

(71) Applicant: Centrix Aero, LLC, Kent, WA (US)

(72) Inventor: Andres Hernandez, Yorba Linda, CA (US)

(73) Assignee: CENTRIX AERO, LLC, Kent, WA (US)

(*) Notice: Subject to any disclaimer, the term of this patent is extended or adjusted under 35 U.S.C. 154(b) by 419 days.

(21) Appl. No.: 15/905,654

(22) Filed: Feb. 26, 2018

(65) Prior Publication Data
US 2018/0245371 A1 Aug. 30, 2018

Related U.S. Application Data

(60) Provisional application No. 62/464,311, filed on Feb. 27, 2017.

(51) Int. Cl.
*B64D 29/00* (2006.01)
*E05B 41/00* (2006.01)
*B64D 29/08* (2006.01)
*B64D 29/06* (2006.01)

(52) U.S. Cl.
CPC .............. *E05B 41/00* (2013.01); *B64D 29/06* (2013.01); *B64D 29/08* (2013.01)

(58) Field of Classification Search
CPC .......... E05B 41/00; B64D 29/06; B64D 29/08
USPC .......................................................... 73/76
See application file for complete search history.

(56) References Cited

U.S. PATENT DOCUMENTS

| | | | |
|---|---|---|---|
| 1,978,935 | A | 10/1934 | Douglas |
| 2,370,336 | A | 2/1945 | Wallace |
| 2,379,786 | A | 7/1945 | Bugg et al. |
| 2,649,884 | A | 8/1953 | Westover |
| 2,775,155 | A | 12/1956 | Tompkins et al. |
| 2,936,015 | A | 5/1960 | Rapata |
| 2,994,242 | A | 8/1961 | Buff et al. |
| 3,469,493 | A | 9/1969 | Fisher |
| 5,065,490 | A | 11/1991 | Wivagg et al. |

(Continued)

FOREIGN PATENT DOCUMENTS

| | | |
|---|---|---|
| CN | 104654958 A | 5/2015 |
| EP | 0275160 A2 | 7/1988 |

(Continued)

OTHER PUBLICATIONS

ISA Korean Intellectual Property Office, International Search Report and Written Opinion Issued in Application No. PCT/US2018/019769, dated Jun. 8, 2018, 12 pages.

*Primary Examiner* — Max H Noori
*Assistant Examiner* — Masoud H Noori
(74) *Attorney, Agent, or Firm* — McCoy Russell LLP

(57) ABSTRACT

A sensor pin coupled to a latch is described herein. The sensor pin includes a sensor pin body including a sensor, a sensor bolt extending from the sensor pin body and having a rod cavity arranged at a non-straight angle with regard to an interface pin cavity, an actuator rod slidably positioned within the rod cavity, and an interface pin slidably positioned within the interface pin cavity and mechanically coupled to the actuator rod such that actuation of the interface pin causes axial movement of the actuator rod toward the sensor. Additionally, actuation of the sensor by the actuator rod triggers transmission of a latch state signal by the sensor.

20 Claims, 6 Drawing Sheets

(56) References Cited

U.S. PATENT DOCUMENTS

| | | | |
|---|---|---|---|
| 5,483,842 A | | 1/1996 | Foreman |
| 5,642,042 A | * | 6/1997 | Goossens ............... G01P 1/00 |
| | | | 324/173 |
| 5,704,752 A | | 1/1998 | Logerot |
| 6,022,056 A | * | 2/2000 | Cope ................... E05B 17/22 |
| | | | 292/144 |
| 6,174,118 B1 | | 1/2001 | Rebers |
| 6,287,044 B1 | | 9/2001 | Huber |
| 6,358,051 B2 | * | 3/2002 | Lang ................. A61C 8/0089 |
| | | | 433/173 |
| 7,661,196 B1 | * | 2/2010 | Kipnes .................. G01B 3/48 |
| | | | 33/199 R |
| 7,814,858 B1 | * | 10/2010 | Walczak ............ F16B 41/005 |
| | | | 116/307 |
| 2002/0144574 A1 | | 10/2002 | Avetisian et al. |
| 2007/0243037 A1 | | 10/2007 | Pratt |
| 2009/0102649 A1 | * | 4/2009 | Diener .................. E05B 45/06 |
| | | | 340/542 |
| 2016/0299016 A1 | | 10/2016 | Campbell |

FOREIGN PATENT DOCUMENTS

| | | | |
|---|---|---|---|
| GB | 413403 A | | 7/1934 |
| GB | 624714 A | | 6/1949 |
| GB | 1548964 A | | 7/1979 |
| JP | H1151018 A | | 2/1999 |
| JP | H11118637 A | | 4/1999 |
| WO | 2010141132 A2 | | 12/2010 |

* cited by examiner

SENSOR PIN

CROSS REFERENCE TO RELATED APPLICATIONS

The present application claims priority to U.S. Provisional Application No. 62/464,311, entitled "SENSOR PIN," and filed on Feb. 27, 2017, the entire contents of which are hereby incorporated by reference for all purposes.

TECHNICAL FIELD

This description relates generally to a sensor pin, such as for an aircraft cowling.

BACKGROUND

Latches, such as hook latches, are used to secure two sections of an aircraft cowling together. Typically the latch is located on the bottom of the engine, which can be difficult for ground personnel (e.g., mechanics, safety inspectors, flaggers, etc.,) to view and verify latch closure prior to takeoff. An unsecured latch can have catastrophic consequences for the airplane and its passengers causing wing component damage, engine fires, etc. Furthermore, market demands to increase aircraft size and payloads have led to increases in engine size. Increasing engine size places the cowling closer to the ground, exacerbating the problem of visual latch inspection.

Attempts have been made to enhance the visibility of cowl latches. For instance, streamers have been added to hook latches which are attached to a key that can only be removed when the latch is fully closed. Others latch designs intended to increase latch visibility have included an auxiliary handle that folds on top of the primary handle. However, both approaches include either additional parts within the latch or parts that are kept in the aircraft or by ground personnel. Both of the approaches therefore add complexity and weight to the latch mechanism, resultantly increasing the cost of the latch. Moreover, even with increased latch visibility unhooked or partially unhooked latches may still go unnoticed during visual inspection, due to human error.

SUMMARY

The inventor has recognized the aforementioned problems and have developed a pin sensor to at least partially address the problems. The sensor pin includes a sensor pin body including a sensor, a sensor bolt extending from the sensor pin body and having a rod cavity arranged at a non-straight angle with regard to an interface pin cavity, an actuator rod slidably positioned within the rod cavity, and an interface pin slidably positioned within the interface pin cavity and mechanically coupled to the actuator rod such that actuation of the interface pin causes axial movement of the actuator rod toward the sensor. Additionally, actuation of the sensor by the actuator rod triggers transmission of a latch state signal by the sensor. The latch state signal is indicative of latch closure and/or non-closure and may be sent to a mobile computing device carried by ground personnel and/or may be sent to a computing device in an airplane cockpit or cabins in other types of vehicles. In this way, latch closure and non-closure can be indicated to ground personnel, inspectors, pilots, drivers, etc. As a result, confidence in the latch's current condition can be increased and the likelihood of a latch being left open is therefore significantly reduced. In the airplane use-case scenario, the likelihood of engine damage caused by the cowling being left open in flight is therefore reduced. Thus, the sensor pin described above increases safety in airplanes or other vehicle systems utilizing the pin.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

Many of the attendant features will be more readily appreciated as the same becomes better understood by reference to the following detailed description considered in connection with the accompanying drawings.

BRIEF DESCRIPTION OF THE DRAWINGS

FIGS. 2-6 are drawn to scale. However, other relative dimensions may be used in other embodiments.

DETAILED DESCRIPTION

A sensor pin is described herein which allows a state of a latch to be confidently detected by the pin. The sensor pin may include a sensor pin body with a sensor bolt extending therefrom. The sensor bolt may attach to a portion of a latch. Additionally, the sensor bolt includes a cavity housing an interface pin extending out of the sensor pin. When the interface pin is actuated, the pin interacts with an actuator rod that activates a sensor. Actuation of the pin may occur when the latch is closed and/or opened. The sensor may then send a latch state signal indicative of a state of the latch to a computing device such as a mobile computing device carried by ground personnel, a computing device in an airplane cockpit, etc. The latch state signal enables personnel (e.g., pilots, inspector, mechanics, safety inspectors, drivers, etc.,) to be provided with information indicative of the latch's condition, thereby decreasing the likelihood of a failure to recognize a latch that has been left open accidentally. As a result, latch safety is increased. In one example, the actuator rod and the interface pin may include mated surfaces that are complimentary angled to allow axial movement of the interface pin to be translated into axial movement of the actuator rod to actuate the sensor. In this way, interface pin movement can be efficiently translated into axial motion of the actuator rod.

Figure 1:
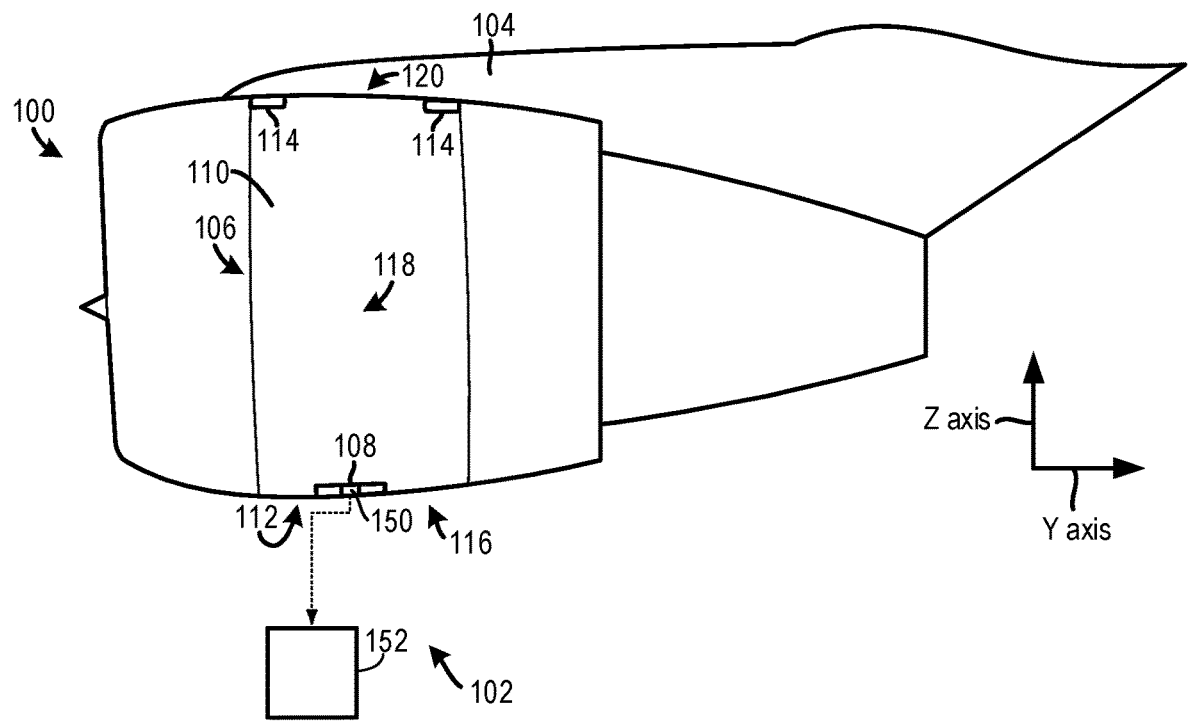
FIG. 1 is an illustration of an aircraft cowling with a hook latch coupling sections of the cowling and a sensor pin.
Figure 4:
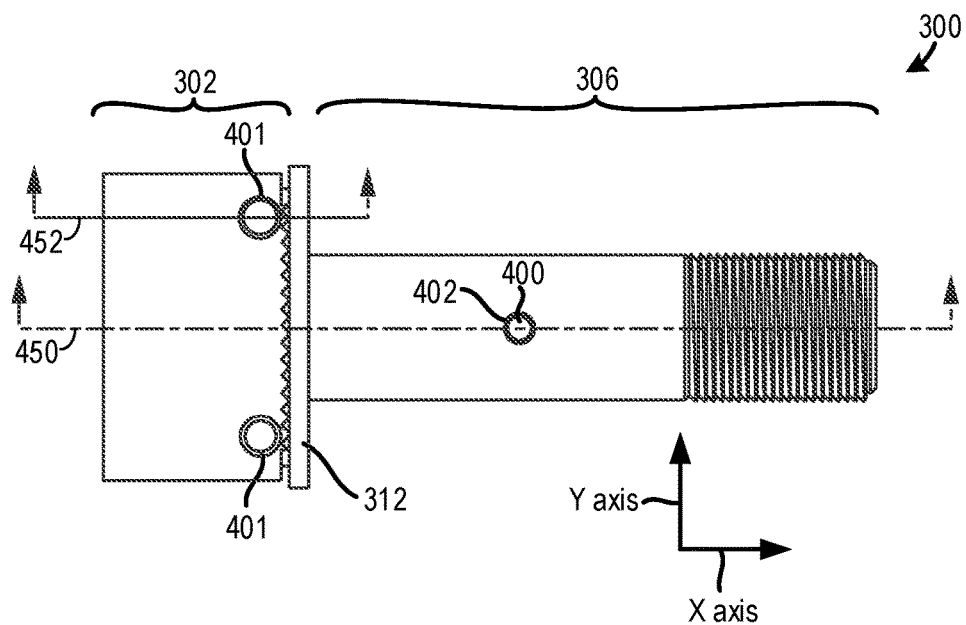
FIG. 4 is a side view of the sensor pin, shown in FIG. 3.
Figure 2:
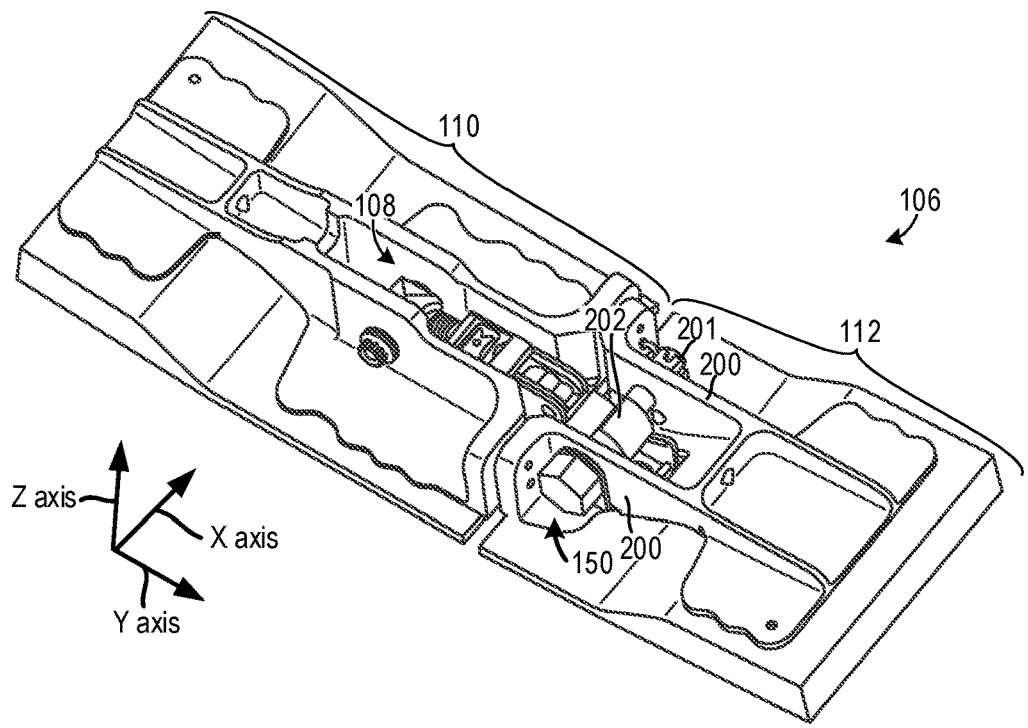
FIG. 2 shows a detailed view of the hook latch with the sensor pin in the aircraft cowling, shown in FIG. 1.
Figure 3:
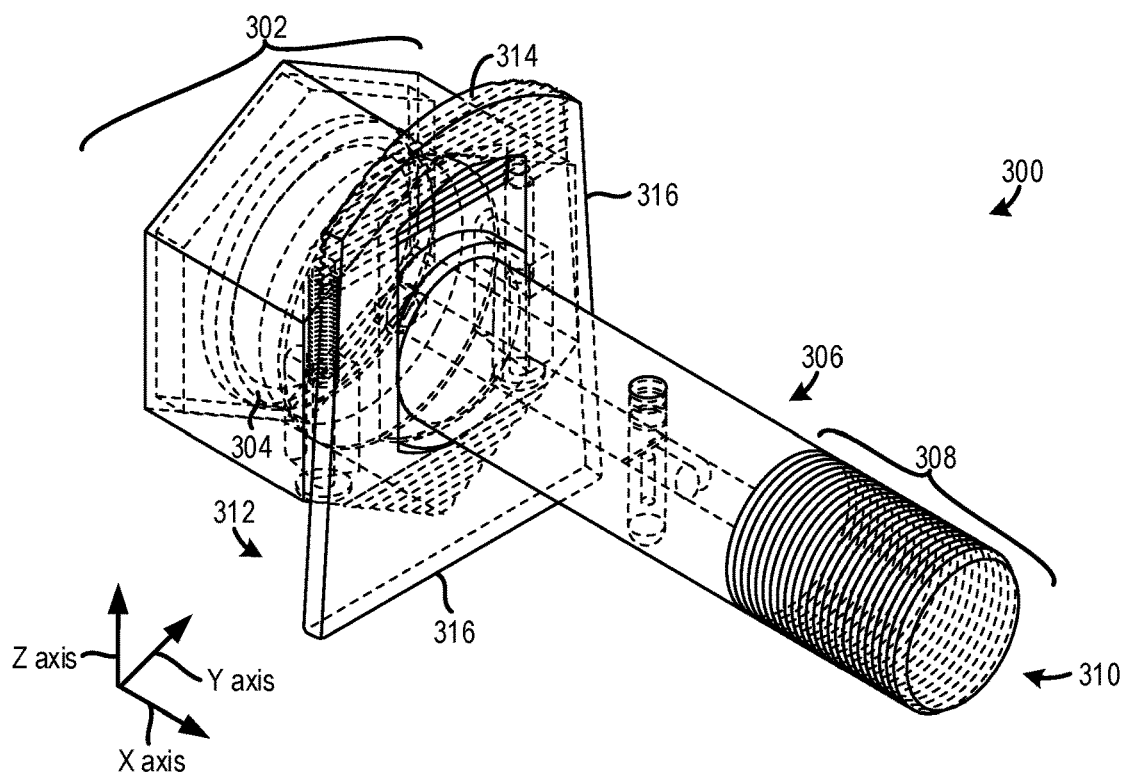
FIG. 3 is a perspective view of an example of a sensor pin.
Figure 5:
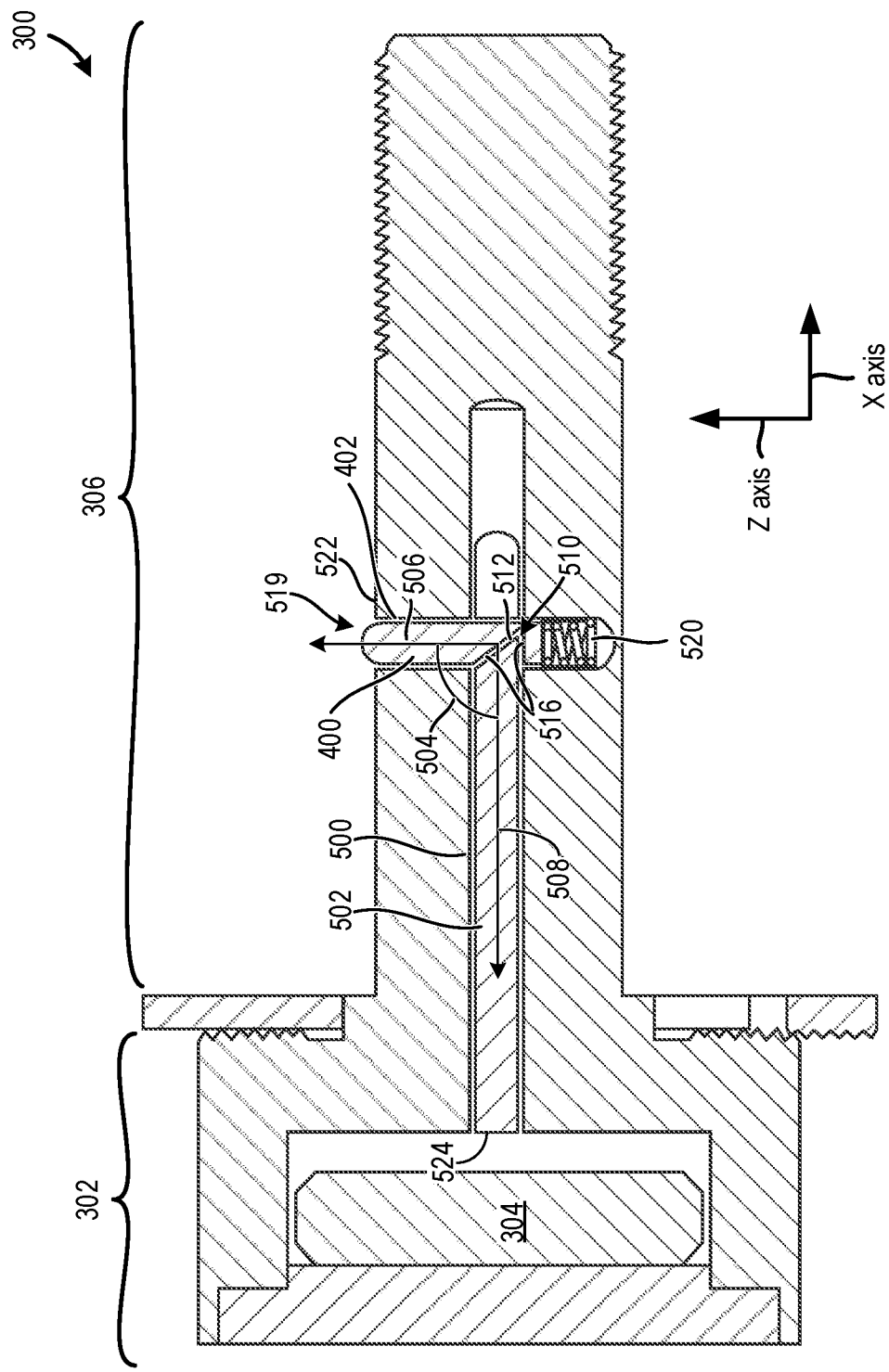
FIG. 5 is a first cross-sectional view of the sensor pin, shown in FIG. 4.
Figure 6:
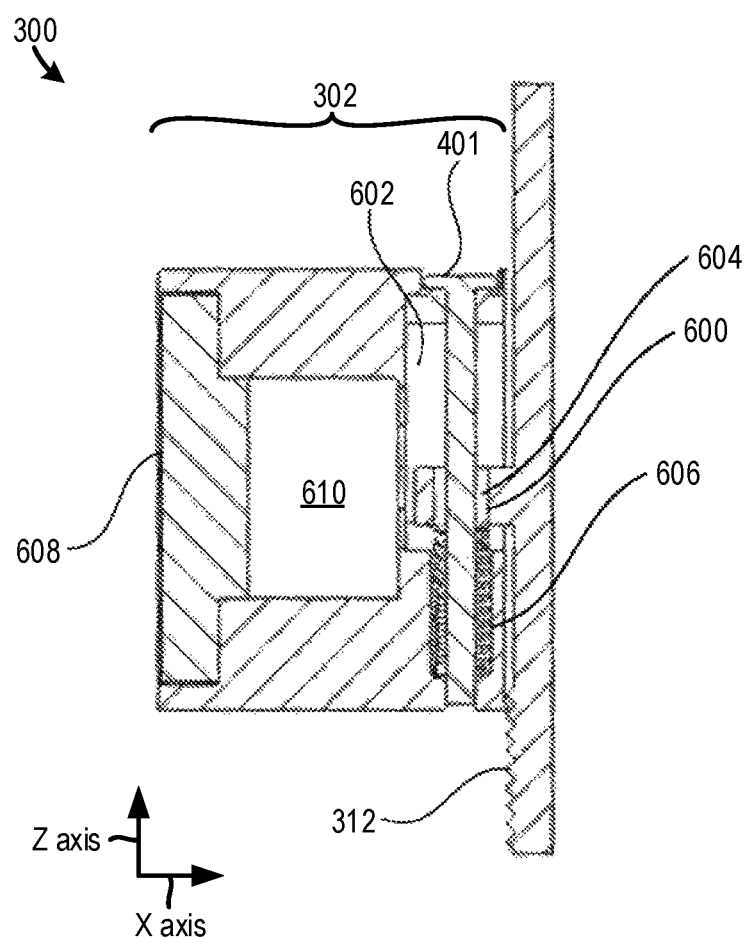
FIG. 6 is a second cross-sectional view of the sensor pin, shown in FIG. 4.
Figure 7:
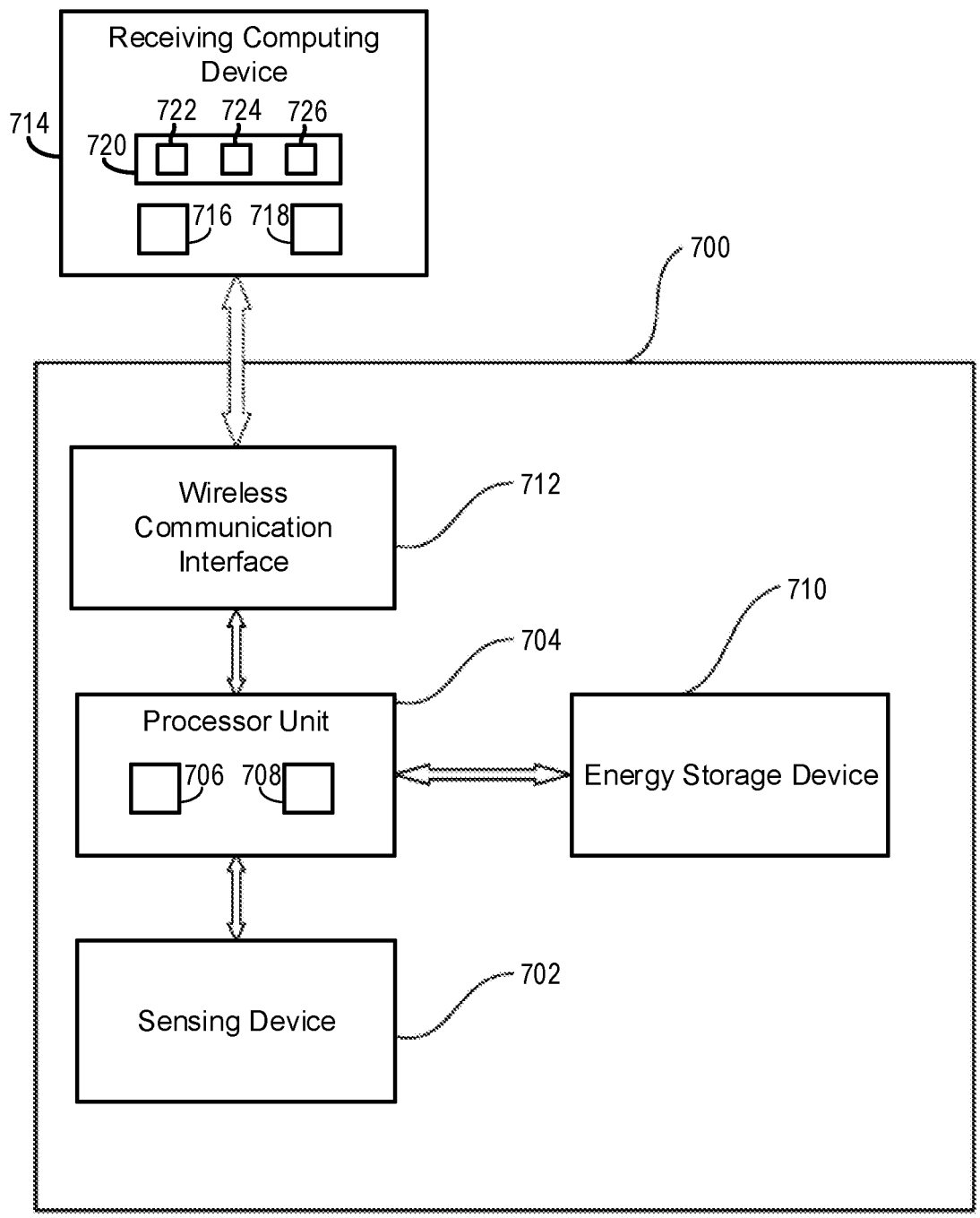
FIG. 7 is schematic diagram of an example of a sensor within a sensor pin.
Figure 8:
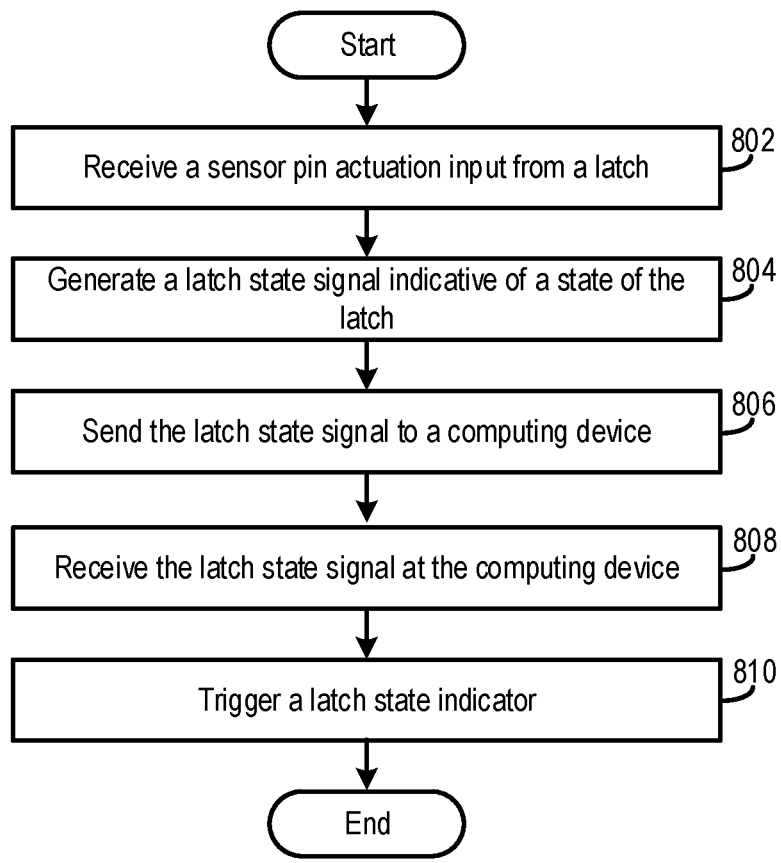
FIG. 8 shows a method for operation of a sensor pin system.

FIG. 1 shows an exemplary operating environment for a sensor pin system including a hook latch and a sensor pin. FIG. 2 shows a detailed illustration of the hook latch and the sensor pin, shown in FIG. 1. FIG. 3 is a perspective view of an example of a sensor pin. FIG. 4 is a side view of the sensor pin, shown in FIG. 3. FIG. 5 is a first cross-sectional view of the sensor pin, shown in FIG. 4. FIG. 6 is a second cross-sectional view of the sensor pin, shown in FIG. 4. FIG. 7 is schematic diagram of a sensor pin and associated electronic componentry. FIG. 8 shows a method for operation of a sensor pin system.

FIG. 1 illustrates a jet aircraft engine 100 with a sensor pin system 102. The engine 100 is shown attached to a wing 104 of an aircraft. The sensor pin system 102 may include a cowling 106, a hook latch 108, and/or a sensor pin 150. However, in other examples, the sensor pin system 102 may include just the sensor pin 150 or the sensor pin and the hook latch 108.

Although the present examples, and particularly FIGS. 1 and 2, are described and illustrated herein as being a latch system for use in a jet aircraft engine and specifically a jet engine cowling, the depicted system is provided as an example and not a limitation. Those skilled in the art will appreciate, the present example of the sensor pin system is suitable for application in a variety of different settings, such as in prop driven aircrafts, automotive vehicles, or any setting where it is desirable to sense the state of a latch such as in factory systems, in building systems, etc.

The cowling 106 has moveable cowl sections including a first cowl section 110 and a second cowl section 112 designed to pivot or otherwise move to reveal internal components in the engine 100. In this way, mechanics or other ground personnel can perform inspections, maintenance procedures, repair procedures, etc., as desired. The moveable cowl sections, 110 and 112, pivot about joints 114 positioned on a top side 120 of the engine 100, in the illustrated example. However, it will be appreciated that other locations of the cowl pivot joints have been contemplated. The hook latch 108 latches the first cowl section 110 to the second cowl section 112.

Additionally, the sensor pin 150 is designed to sense a state of the hook latch 108. Specifically, the sensed state of the hook latch may be an opened and/or closed state. Additionally, the sensor pin 150 is shown electronically communicating with a computing device 152. Specifically, the sensor pin 150 may interface with latch state indicators within or in electronic communication with the computing device 152 that indicate closure and/or non-closure of the hook latch. The computing device 152 may be included in the sensor pin system 102, in one example. However, in other examples, the computing device 152 may not be included in the sensor pin system 102.

The hook latch 108 is show positioned on an underside 116 of the cowling 106, in the example shown in FIG. 1. When the hook latch 108 is positioned under the cowl, mechanics may more easily access and open/close the cowling 106 during inspection, maintenance, and repair procedures. However, other hook latch positions have been contemplated such as locations on lateral sides 118 or the top side 120 of the cowling 106.

The latch 108 and sensor pin 150 are schematically depicted in FIG. 1. However, it will be appreciated that the latch 108 and sensor pin 152 have greater structural complexity. The structural features of the hook latch and the sensor pin are described in more detail herein with regard FIGS. 2-6.

Furthermore, axes X, Y, and/or Z are provided in FIGS. 1-6 for reference. It will be appreciated that axes X, Y, and Z are perpendicular to one another. In one example, the Z axis may be parallel to a gravitational axis. In such an example, the X axis and the Y axis therefore have horizontal orientations. Specifically, in one example, the Y axis may be referred to as a longitudinal axis and the X axis may be referred to as a lateral axis. However, other orientations of the reference axes X, Y, and Z have been envisioned.

FIG. 2 shows a more detailed view of the hook latch 108 and cowling 106, shown in FIG. 1. Specifically, FIG. 2 shows the first cowl section 110 and the second cowl section 112 of the cowling 106 secured together via the hook latch 108. Thus, the hook latch 108 is in a closed configuration in FIG. 2. The sensor pin 150 extends through a portion of the second cowl section 112. Specifically, in the illustrated example, the sensor pin 150 extends laterally through walls 200. However, other sensor pin positions and orientations have been contemplated. Additionally, the sensor pin 150 is shown attached to (e.g., threadingly engaged with) a nut 201. However, additional or alternative techniques for securing the sensor pin within the second cowl section may be used.

As shown in FIG. 2, a hook 202 in the hook latch 108 is in contact with the sensor pin and depresses an actuator pin, described in greater detail herein. Moreover, the hook 202 may be secured on the sensor pin 150 in the closed configuration. Specifically, the hook 202 is in contact with the sensor pin 150 such that a closing force is exerted on both of the first cowl section 110 and the second cowl section 112 to bring the sections together in the closed position. On the other hand, in an open position the hook 202 may be spaced away from the sensor pin 150.

FIG. 3 shows an example of a sensor pin 300. It will be appreciated that the dashed lines in FIG. 3 are provided to indicate internal componentry in the pin and provide a see-through type view. The sensor pin 300 shown in FIG. 3 is an example of the sensor pin 150, depicted in FIGS. 1 and 2. The sensor pin 300 includes a sensor pin body 302 with a sensor 304. As shown, the sensor pin body 302 encloses the sensor 304. However, in other examples, the sensor pin body 302 may partially enclose the sensor 304 or the sensor may be positioned external to the sensor pin body.

A sensor bolt 306 extends (e.g., radially extends) from the sensor pin body 302. The sensor bolt 306 includes a threaded portion 308 at an end 310 of the bolt. However, other locations of the threaded portion have been contemplated. The threaded portion 308 may be threadingly engaged with threaded section of a latch, such as the hook latch 108, shown in FIGS. 1 and 2. Thus, the latch may be included in an aircraft. However, the latch may be included in other systems in other examples, such as automotive vehicle systems, industrial systems, etc.

The sensor pin 300 shown in FIG. 3 also includes a rotation control tab 312 extending from (e.g., radially extending from) the sensor bolt 306. The rotation control tab 312 is designed to secure the sensor pin 300 in a desired orientation when installed in a latch. Specifically, the rotation control tab 312 may have a profile that allows the sensor pin 300 to mate in a recess in a latch in a desired orientation. A curved edge 314 of the rotation control tab 312 may be distinguished from straight edges 316 of the rotation control tab 312 and therefore may serve as a visual indicator of a desired pin orientation.

FIG. 4 shows a side view of the sensor pin 300 including the sensor pin body 302, sensor bolt 306, and the rotation control tab 312. An interface pin 400 is shown at least partially positioned in an interface pin cavity 402. It will be appreciated that during sensor pin actuation a hook, such as the hook 202, shown in FIG. 2, may be in contact with the interface pin 400 and pushes the interface pin further into the interface pin cavity 402. Due to the layout of the internal parts in the sensor pin 300, described in greater detail herein, depression of the interface pin 400 into the interface pin cavity 402 triggers actuation of the sensor 304 in the sensor pin 300, shown in FIG. 3.

Continuing with FIG. 4, control pins 401 are shown extending through the sensor pin body 302. The control pins 401 allow the interface pin 400 to be set in a desired radial location during installation. Consequently, the likelihood of misaligned installation is reduced, thereby improving installation efficiency. The profile and placement of the control pins 401 are discussed in greater detail herein with regard to FIG. 6. Furthermore, FIG. 4 depicts two control pins extending through the sensor pin body. However, in other examples, a single control pin may extend through the sensor pin body or three or more control pins may extend through the sensor pin body. Viewing plane 450 indicates the cross-sectional view shown in FIG. 5 and viewing plane 452 indicates the cross-sectional view shown in FIG. 6.

FIG. 5 shows a cross-sectional view of the sensor pin 300 with the sensor pin body 302 and sensor bolt 306. Additionally, an actuator rod cavity 500 is illustrated. The interface pin cavity 402 is also shown in FIG. 5. In one example, the actuator rod cavity 500 and the interface pin cavity 402 may have cylindrical shapes. However, other shapes of the cavities have been contemplated such as cavities with square, rectangular, etc., cross-sections or cavities with two planar sides and two curved sides, etc., for example.

The actuator rod cavity 500 houses an actuator rod 502 and the interface pin cavity 402 houses the interface pin 400. The actuator rod 502 has a profile that enables the interface pin to slide in opposing axial directions in the actuator rod cavity 500. Thus, the diameter of the actuator rod 502 may be less than the diameter of the actuator rod cavity 500. The variance in the diameters of the actuator rod and the actuator rod assembly may be selected, in one example, to reduce the amount of radial movement of the actuator rod while still allowing axial movement of the rod in the cavity. Additionally, the interface pin cavity 402 has a larger diameter than the interface pin 400 to enable the interface pin to slide therein in opposing axial directions.

In the example shown in FIG. 5, the interface pin 400 is arranged at a non-straight angle 504 with regard to the actuator rod 502. The angle 504 is formed between an axis 506 of the interface pin 400 and an axis 508 of the actuator rod 502. It will be appreciated that interface pin 400 and the interface pin cavity 402 may share a common axis (e.g., common central axis). Likewise, the actuator rod 502 and the actuator rod cavity 500 may also share a common axis (e.g., common central axis). Specifically, in the illustrated example, the angle 504 formed between the actuator rod 502 and the interface pin 400 is 90°. However, other angles or angle ranges have been contemplated, such as a 45°, 60°, 80°, etc., or an angle range of 45°-90°, an angle range of 50-125°, etc.

Additionally, an end 510 (e.g., tapered end) of the actuator rod 502 including a surface 512 is mated with a recess including surfaces 516 in the interface pin 400. Thus, the end 510 of the actuator rod 502 is complimentary with the recess in the interface pin 400.

As shown, an end 519 of the interface pin 400 extends beyond an outer surface 522 of the sensor bolt 306. The end 519 may be curved to facilitate smooth interaction with the latch. However, other contours of the pin's end may be utilized, in other examples. The position of the interface pin 400 shown in FIG. 5 may correspond to an unactuated position indicating that the latch in the cowling is not closed. During actuation of the interface pin 400, the pin is moved inward responsive to an actuation input, such as an input from a latch. When actuated the interface pin 400 may not extend beyond the outer surface 522 of the sensor bolt. Additionally, when the interface pin 400 is moved inward an end 524 of the actuator rod 502 is moved axially towards the sensor 304 due to the complementary angled surfaces in the actuator rod 502 and the interface pin. Specifically, the surface 512 at the end 510 of the actuator rod 502 interacts with one of the surfaces 516 in the recess of the actuator rod 502 when the interface pin 400 is moved inward. Such an interaction between the complementary surfaces causes the end 524 of the actuator rod 502 to move towards the sensor 304 and in some cases push into the sensor.

It will be appreciated that the sensor 304 is configured to sense proximity or direct interaction between the end 510 of the actuator rod 502 and the sensor. For instance, a threshold proximity (e.g., 0.5 mm, 1.0 mm, 2.0 mm, etc.,) between the actuator rod and the sensor, indicative of latch closure, may activate the sensor. In response to the sensor 304 sensing the proximity the sensor may send a latch state signal to a computing device, such as the computing device 152, shown in FIG. 1. In another example, the lack of proximity between the sensor and the actuation rod may cause a latch state signal to be sent to the computing device. In yet other examples, two distinct latch state signals may be sent to the computing device, one corresponding to a condition where proximity between the actuation rod and the sensor exists and the other corresponding to a condition where there is an absence of proximity between the actuation rod and the sensor. The latch state signal may therefore be indicative of latch closure and/or nonclosure. When the computing device receives the latch state signal the computing device may trigger a latch state indicator to alert personnel of the state of the latch, either in an open or closed configuration. In this way, personnel may be informed of the latch state, thereby improving safety in the airplane or other vehicles employing the sensor pin.

In the illustrated example, the surface 512 and one of the surfaces 516 are arranged at a 45° angle with regard to one another. However, many angular orientations of the complementary surfaces have been contemplated such as 30° arrangements, 60° arrangements, 20°-70° ranges, etc.

Additionally, a spring 520 is shown positioned in a section of the interface pin cavity 402 below the interface pin 400. The spring 520 is loaded when the interface pin 400 is depressed via latch actuation and the unloaded when the latch not actuating the interface pin. In this way, the interface pin 400 may return to a position where a portion of the pin extends beyond the outer surface 522 of the sensor bolt 306.

FIG. 6 shows another cross-sectional view of the sensor pin 300. The rotation control tab 312 and the sensor pin body 302 are again illustrated. The rotation control tab 312 includes a protrusion 600, which is included in a tab cavity 602 in the sensor pin body 302. One of the control pins 401 is also partially disposed in the tab cavity 602. Specifically, the control pin 401 may extend vertically through the sensor pin body 302. However, other control pin orientations have been contemplated. The protrusion 600 has a hole 604 allowing the control pin 401 to pass there through and therefore locks the control tab in a desired orientation.

In some examples, the control pin 401 may be held in place with the tab cavity 602 by a compression coupling or by a thread coupling. A variety of other coupling methods may also be used to secure the control pin 401 in position.

In some examples, a control pin spring 606 is also disposed within the tab cavity 602 and biased for the ease of popping out for the control pin 401 once the control pin disengages from the tab cavity 602. In some examples, the rotation control tab 312 may be held in place by two sets of control pins, which may be positioned on opposite sides of the sensor pin body 302. Further, in one example, both of the control pin sets may adopt identical structure. A cap 608 is also shown in FIG. 6. The cap 608 seals a cavity 610 housing the sensor 304, shown in FIG. 5. Such sealing may be accomplished via thread sealing, snap sealing, etc. In one example, the cap 608 may be made of non-metal material such that the wireless signal from the sensor 304 may be transmitted easily.

FIG. 7 shows a schematic depiction an example of a sensor 700 and corresponding hardware, devices, etc. It will be appreciated that sensor 700 is an example of the sensor 304, shown in FIGS. 3 and 5. Furthermore, it will be appreciated that the sensor 700 may be included in the sensor pin 150 shown in FIGS. 1 and 2 and/or the sensor pin 300, shown in FIGS. 3-6.

The sensor 700 is shown including a sensing device 702 such as a capacitive touch sensing device, a switch, etc. The sensing device 702 functions to sense the movement and/or proximity of an actuator rod, such as the actuator rod 502 shown in FIG. 5. In one example, the sensing device 702 may be implemented as a direct touch sensor that is actuated by direct touch from the sensing device 702. Additionally or alternatively, the sensing device 702 may be implemented as a non-direct touch sensor, such as a proximity sensor or a capacitive touch sensor, to sense the movement of the actuator rod. One of ordinary skill in the art may understand various sensor configurations may be implemented for this application. Additionally, the sensing device 702 is in electronic communication (e.g., wired and/or wireless electronic communication) with a processor unit 704.

The processor unit 704 may be embodied in a number of different ways. For example, the processor unit 704 may include one or more processing devices such as a microprocessor, a controller, a digital signal processor (DSP), a processing element with or without an accompanying DSP, or various other processing devices including integrated circuits such as, for example, an ASIC (application specific integrated circuit), an FPGA (field programmable gate array), or a microcontroller unit (MCU). In the illustrated example, the processor unit 704 is shown including a processor 706 and memory 708. The processor 706 may be a single-core or multi-core device, and the instructions executed thereon may be configured for sequential, parallel, and/or distributed processing.

Additionally, the memory 708 may include volatile, nonvolatile, non-transitory, dynamic, static, read/write, read-only, random-access, sequential-access, location-addressable, file-addressable, and/or content-addressable devices. It will be appreciated that the methods, control techniques, etc., described herein may be stored as instructions in the memory 708 executable by the processor 706. Specifically, the instructions may be stored in non-transitory memory that when executed cause the processor to carry out the various method steps described herein. Specifically in one example, in response to the sensing device sensing proximity or contact with the actuation rod the processor unit 704 may generate a latch state signal indicative of closure of the latch to a wireless communication interface 712. In turn, the wireless communication interface 712 may send a latch state signal wirelessly to a receiving computing device 714.

The processor unit 704 may receive power from an energy storage device 710 (e.g., battery, capacitor, etc.) Additionally, the processor unit 704 may be in electronic communication with the wireless communication interface 712. The wireless communication interface 712 may include hardware and/or other devices transmitting signals with one or more communication protocols, such as Wi-Fi, Bluetooth, Zigbee, Cellar, NFC (Near Field Communication), infrared communication, etc. The wireless communication interface 712 may include, for example, an antenna (or multiple antennas) and supporting hardware and/or software for enabling wireless communications.

The receiving computing device 714 is shown in wireless electronic communication with the wireless communication interface 712, as discussed above. The receiving computing device 714 may be a mobile computing device such as computing device carried by airplane ground personnel (e.g., safety inspectors, mechanics, etc.,) a computing device in a cockpit of an airplane, and/or a computing device in a cabin of a vehicle. The receiving computing device 714 includes memory 716 and a processor 718. The memory 716 may store instructions executable by the processor 718 to implement the methods, routines, etc., described herein. The memory 716 may include volatile, nonvolatile, non-transitory, dynamic, static, read/write, read-only, random-access, sequential-access, location-addressable, file-addressable, and/or content-addressable devices.

As discussed above the receiving computing device 714 may receive a latch state signal indicative of latch closure and/or non-closure. The receiving computing device 714 may trigger a latch state indicator 720 in response to receiving the latch state signal. The latch state indicator 720 may include an audio indicator 722, a visual indicator 724 (e.g., graphical element in a programmable display, a light, touch screen graphical icon, etc.,), and/or a haptic indicator 726. In this way, ground personnel and/or pilots may be alerted of the state of the airplane cowl latch, thereby decreasing the likelihood of the cowl latch being left open during flight.

FIGS. 1-7 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

FIG. 8 shows a method 800 for operating a sensor pin system. The method 800 may be implemented by the components, devices, etc., in the sensor pin systems described above with regard to FIGS. 1-7 or may be implemented by other suitable sensor pin systems.

At 802, the method includes receiving a sensor pin actuation input from a latch such as a cowl latch. The sensor pin actuation input may include depression of an actuator pin in a sensor pin. Depression of the actuator pin may cause axial movement of the actuator rod towards the sensor in the sensor pin. Thus, the depression of the actuator pin will in turn actuate the sensor, in one example.

Next at 804, the method includes generating a latch state signal indicative of a state of the latch in response to actuation of the sensor at the sensor.

Next, at 806, the method includes sending the latch state signal to a computing device and at 808 the method includes receiving the latch state signal at the computing device. It will be appreciated that the latch state signal may be wirelessly transmitted to the computing device from the sensor pin. At 810, the method includes triggering a latch state indicator. The latch state indicator may include audio, visual, and/or haptic devices alerting personnel of the state of the latch. In this way, personnel may be confidently informed of a closure and/or a non-closure condition of the latch, which reduces the chances of the latch being left open prior to take-off. Consequently, safety in the airplane, vehicle, or system utilizing the sensor pin is increased.

The invention will further be described in the following paragraphs. In one aspect, a sensor pin coupled to a latch is provided that includes a sensor pin body including a sensor, a sensor bolt extending from the sensor pin body and having a rod cavity arranged at a non-straight angle with regard to an interface pin cavity, an actuator rod slidably positioned within the rod cavity, and an interface pin slidably positioned within the interface pin cavity and mechanically coupled to the actuator rod such that actuation of the interface pin causes axial movement of the actuator rod toward the sensor, where actuation of the sensor by the actuator rod triggers transmission of a latch state signal by the sensor.

In another aspect, a sensor pin system is provided. The sensor pin system includes a cowling including a first cowl section and a second cowl section at least partially enclosing an engine, a hook latch securing the first cowl section to the second cowl section in a closed configuration, and a sensor pin coupled to the hook latch, the sensor pin comprising, a sensor pin body including a sensor, a sensor bolt extending from the sensor pin body and having a rod cavity arranged at a non-straight angle with regard to an interface pin cavity, an actuator rod slidably positioned within the rod cavity, and an interface pin slidably positioned within the interface pin cavity and mechanically coupled to the actuator rod such that actuation of the interface pin causes axial movement of the actuator rod toward the sensor, where actuation of the sensor by the actuator rod causes the sensor to transmit a latch state signal.

In yet another aspect, a method for operating a sensor pin system is provided. The method includes, at a sensor pin, receiving a sensor pin actuation input from a latch, the sensor pin including, a sensor pin body including a sensor, a sensor bolt extending from the sensor pin body and having a rod cavity arranged at a non-straight angle with regard to an interface pin cavity, an actuator rod slidably positioned within the rod cavity, and an interface pin slidably positioned within the interface pin cavity and mechanically coupled to the actuator rod such that actuation of the interface pin causes axial movement of the actuator rod toward the sensor, where actuation of the sensor by the actuator rod causes the sensor to transmit a latch state signal, and in response to receiving the sensor pin actuation input, generating a latch state signal indicative of a state of the latch. In one example, the method may further include at the sensor pin, sending the latch state signal to a computing device and, at the computing device, receiving the latch state signal from the sensor pin.

In any of the aspects or combinations of the aspects, the actuator rod and the interface pin may include mated surfaces that are complimentary angled to allow axial movement of the interface pin to be translated into axial movement of the actuator rod.

In any of the aspects or combinations of the aspects, the sensor pin may further include a spring positioned in the interface pin cavity and coupled to the interface pin.

In any of the aspects or combinations of the aspects, the latch state signal may be a wireless signal transferred to a latch state indicator indicating a latched or unlatched state of the latch.

In any of the aspects or combinations of the aspects, the latch state indicator may include one or more of a visual indicator, an audio indicator, and a haptic indicator.

In any of the aspects or combinations of the aspects, the cowling may be an aircraft cowling and the sensor pin may further include a threaded section on an end of the sensor bolt in threading engagement with a hook latch in an aircraft cowling.

In any of the aspects or combinations of the aspects, the sensor pin may further include a rotation control tab radially extending from the sensor bolt and a rotation control pin extending through a hole of a protrusion of the rotation control tab to lock the rotation control tab in a desired radial orientation.

In any of the aspects or combinations of the aspects, the sensor pin system may further include a spring positioned in the interface pin cavity and coupled to the interface pin and where the actuator rod and the interface pin include mated surfaces that are complimentary angled to allow axial movement of the interface pin to be translated into axial movement of the actuator rod.

In any of the aspects or combinations of the aspects, the sensor pin system may further include a computing device wirelessly receiving the latch state signal and in response to receiving the latch state signal triggering a latch state indicator.

In any of the aspects or combinations of the aspects, the sensor pin may further include a threaded section on an end of the sensor bolt threading into the hook latch.

In any of the aspects or combinations of the aspects, the sensor pin system may further include a computing device receiving the latch state signal.

In any of the aspects or combinations of the aspects, the latch state signal may be wirelessly transmitted from the sensor to the computing device.

In any of the aspects or combinations of the aspects, the computing device may be on-board an aircraft including the cowling.

In any of the aspects or combinations of the aspects, the computing device may be a mobile computing device.

In any of the aspects or combinations of the aspects, triggering the latch state indicator may include triggering the latch state indicator to infer latch closure and/or latch non-closure.

In any of the aspects or combinations of the aspects, sending the latch state signal to the computing device may include wirelessly transmitting the latch state signal to the computing device.

In any of the aspects or combinations of the aspects, the computing device may be on-board an aircraft including the latch and where the latch is a cowl latch.

In any of the aspects or combinations of the aspects, the sensor may be a touch sensor.

In any of the aspects or combinations of the aspects, the interface pin may be positioned perpendicular to the actuator rod.

In any of the aspects or combinations of the aspects, the rotation control tab may extend in a radial direction from the sensor bolt.

Those skilled in the art will realize that the process sequences described above may be equivalently performed in any order to achieve a desired result. Also, sub-processes may typically be omitted as desired without taking away from the overall functionality of the processes described above.

The detailed description provided above in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples. Note that the example assembly routines included herein can be used with various connection rod assemblies configurations.

Various actions, operations, and/or functions illustrated and described herein may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used.

It will be appreciated that the configurations and routines disclosed herein are exemplary in nature, and that these specific embodiments are not to be considered in a limiting sense, because numerous variations are possible. For example, the above technology can be applied to a broad range of manufacturing fields such as the aerospace industry, the construction industry, the maritime industry, etc. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A sensor pin coupled to a latch, comprising:
a sensor pin body including a sensor;
a sensor bolt extending from the sensor pin body and having a rod cavity arranged at a non-straight angle with regard to an interface pin cavity;
an actuator rod slidably positioned within the rod cavity; and
an interface pin slidably positioned within the interface pin cavity and mechanically coupled to the actuator rod such that actuation of the interface pin causes axial movement of the actuator rod toward the sensor;
where actuation of the sensor by the actuator rod triggers transmission of a latch state signal by the sensor.

2. The sensor pin of claim 1, where the actuator rod and the interface pin include mated surfaces that are complimentary angled to allow axial movement of the interface pin to be translated into axial movement of the actuator rod.

3. The sensor pin of claim 1, further comprising a spring positioned in the interface pin cavity and coupled to the interface pin.

4. The sensor pin of claim 1, where the latch state signal is a wireless signal transferred to a latch state indicator indicating a latched or unlatched state of the latch.

5. The sensor pin of claim 4, where the latch state indicator includes one or more of a visual indicator, an audio indicator, and a haptic indicator.

6. The sensor pin of claim 1, further comprising a threaded section on an end of the sensor bolt in threading engagement with a hook latch in an aircraft cowling.

7. The sensor pin of claim 1, further comprising a rotation control tab radially extending from the sensor bolt and a rotation control pin extending through a hole of a protrusion of the rotation control tab to lock the rotation control tab in a desired radial orientation.

8. A sensor pin system, comprising:
a cowling including a first cowl section and a second cowl section at least partially enclosing an engine;
a hook latch securing the first cowl section to the second cowl section in a closed configuration; and
a sensor pin coupled to the hook latch, the sensor pin comprising:
a sensor pin body including a sensor;
a sensor bolt extending from the sensor pin body and having a rod cavity arranged at a non-straight angle with regard to an interface pin cavity;
an actuator rod slidably positioned within the rod cavity; and
an interface pin slidably positioned within the interface pin cavity and mechanically coupled to the actuator rod such that actuation of the interface pin causes axial movement of the actuator rod toward the sensor;
where actuation of the sensor by the actuator rod causes the sensor to transmit a latch state signal.

9. The sensor pin system of claim 8, further comprising a spring positioned in the interface pin cavity and coupled to the interface pin and where the actuator rod and the interface pin include mated surfaces that are complimentary angled to allow axial movement of the interface pin to be translated into axial movement of the actuator rod.

10. The sensor pin system of claim 8, further comprising a computing device wirelessly receiving the latch state signal and in response to receiving the latch state signal triggering a latch state indicator.

11. The sensor pin system of claim 8, where the cowling is an aircraft cowling and where the sensor pin further comprises a threaded section on an end of the sensor bolt threading into the hook latch.

12. The sensor pin system of claim 8, further comprising a computing device receiving the latch state signal.

13. The sensor pin system of claim 12, where the latch state signal is wirelessly transmitted from the sensor to the computing device.

14. The sensor pin system of claim 12, where the computing device is on-board an aircraft including the cowling.

15. The sensor pin system of claim 12, where the computing device is a mobile computing device.

16. A method for operating a sensor pin system, comprising:
   at a sensor pin, receiving a sensor pin actuation input from a latch, the sensor pin including; a sensor pin body including a sensor;
   a sensor bolt extending from the sensor pin body and having a rod cavity arranged at a non-straight angle with regard to an interface pin cavity;
   an actuator rod slidably positioned within the rod cavity; and
   an interface pin slidably positioned within the interface pin cavity and mechanically coupled to the actuator rod such that actuation of the interface pin causes axial movement of the actuator rod toward the sensor;
   where actuation of the sensor by the actuator rod causes the sensor to transmit a latch state signal; and
   in response to receiving the sensor pin actuation input, generating a latch state signal indicative of a state of the latch.

17. The method of claim 16, further comprising, at the sensor pin, sending the latch state signal to a computing device and, at the computing device, receiving the latch state signal from the sensor pin.

18. The method of claim 17, where sending the latch state signal to the computing device includes wirelessly transmitting the latch state signal to the computing device.

19. The method of claim 17, where the computing device is on-board an aircraft including the latch and where the latch is a cowl latch.

20. The method of claim 16, where triggering the latch state indicator includes triggering the latch state indicator to infer latch closure and/or latch non-closure.

* * * * *